(12) United States Patent
Johnson (10) Patent No.: US 11,839,174 B2
(45) Date of Patent: Dec. 12, 2023

(54) PRODUCT DELIVERY CONDUIT FOR AN AGRICULTURAL PRODUCT HOPPER ASSEMBLY

(71) Applicant: CNH Industrial America LLC, New Holland, PA (US)

(72) Inventor: Chad Michael Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 204 days.

(21) Appl. No.: 17/243,263

(22) Filed: Apr. 28, 2021

(65) Prior Publication Data

US 2022/0346307 A1 Nov. 3, 2022

(51) Int. Cl.
*B65G 11/18* (2006.01)
*A01C 15/00* (2006.01)
*A01C 7/04* (2006.01)

(52) U.S. Cl.
CPC .......... *A01C 15/006* (2013.01); *B65G 11/186* (2013.01); *A01C 7/04* (2013.01)

(58) Field of Classification Search
None
See application file for complete search history.

(56) References Cited

U.S. PATENT DOCUMENTS 2,499,600 A * 3/1950 Meinzer ..................... C21B 3/08
110/165 R
2,686,083 A * 8/1954 Hampton ................ B65G 53/12
406/141

(Continued)

FOREIGN PATENT DOCUMENTS

CN 105480654 A * 4/2016 ............. B65G 33/24
CN 108249163 A * 7/2018
(Continued)

OTHER PUBLICATIONS

Unverferth Manufacturing Company, Inc., Bulk Handling, https://media.unverferth.com/unverferth/bulk-handling/um-augers-&-conveyors-feb.-2018.pdf; 2018; 8 pgs.
John Deere, 1725 CCS Stack-Fold Planter, https://deerequipment.com/new_equipment/1725-ccs-stack-fold-planter/, Apr. 26, 2021, 20 pgs.

* cited by examiner

*Primary Examiner* — Joseph A Dillon, Jr.
(74) *Attorney, Agent, or Firm* — Rebecca Henkel; Rickard Demille (57) ABSTRACT

A product delivery conduit for an agricultural product hopper assembly includes an inlet segment and an outlet segment. The inlet segment is configured to receive agricultural product from an inlet conduit, the outlet segment is configured to output the agricultural product to a storage area within a hopper of the agricultural product hopper assembly, the outlet segment is configured to be oriented substantially vertically while the agricultural product hopper assembly is in a working position, the inlet segment and the outlet segment are configured to position an outlet of the product delivery conduit above the storage area while the agricultural product hopper assembly is in a non-working position, and the outlet segment is configured to be oriented downwardly while the agricultural product hopper assembly is in the non-working position to enable the agricultural product to flow into the storage area.

20 Claims, 5 Drawing Sheets

(56) References Cited

U.S. PATENT DOCUMENTS

| | | | | |
|---|---|---|---|---|
| 2,806,744 | A | * | 9/1957 | Hall ................ B01J 8/0025 366/101 |
| 2,817,310 | A | * | 12/1957 | Ponzini ............ B41F 23/06 406/146 |
| 2,854,173 | A | * | 9/1958 | Lalin ............ B65G 53/4616 451/75 |
| 3,278,054 | A | * | 10/1966 | Stott ................ B65G 11/066 193/12 |
| 3,434,698 | A | * | 3/1969 | Smith ............ B22F 9/082 366/148 |
| 3,994,366 | A | * | 11/1976 | Okuma ................ B63C 9/22 182/48 |
| 4,009,912 | A | * | 3/1977 | Mraz ................ B65G 53/14 406/120 |
| 4,168,864 | A | * | 9/1979 | Weeks ................ B65G 53/22 406/23 |
| 4,938,372 | A | * | 7/1990 | Morimoto ............ B65G 11/088 220/86.1 |
| 5,002,463 | A | * | 3/1991 | Breckner ............ A01K 79/00 417/20 |
| 5,184,730 | A | * | 2/1993 | Paul ................ B07B 11/04 406/28 |
| 5,213,271 | A | * | 5/1993 | Uribe ................ B05C 19/06 406/146 |
| 5,238,332 | A | * | 8/1993 | Mansson ............ B66C 3/16 406/146 |
| 5,720,306 | A | * | 2/1998 | Korte, Sr. ............ A24B 3/182 131/296 |
| 5,749,684 | A | * | 5/1998 | Horn Feja ............ B65G 53/66 406/28 |
| 6,047,652 | A | | 4/2000 | Prairie et al. |
| 6,581,533 | B1 | | 6/2003 | Hagen et al. |
| 6,609,870 | B2 | * | 8/2003 | Williams ............ B65G 53/28 209/147 |
| 7,255,050 | B2 | | 8/2007 | Johannaber et al. |
| 7,540,695 | B2 | * | 6/2009 | Snowdon ............ B65D 88/128 406/119 |
| 7,779,770 | B2 | | 8/2010 | Sauder et al. |
| 8,685,237 | B2 | * | 4/2014 | Littman ............ B01F 23/60 422/186 |
| 8,733,258 | B2 | | 5/2014 | Patwardhan et al. |
| 8,894,330 | B2 | * | 11/2014 | Gluch ............ A24C 5/391 406/181 |
| 9,237,687 | B2 | | 1/2016 | Sauder et al. |
| 9,826,676 | B2 | | 11/2017 | Borkgren |
| 9,861,025 | B2 | | 1/2018 | Schaefer et al. |
| 10,070,576 | B2 | | 9/2018 | Swanson |
| 10,407,256 | B2 | * | 9/2019 | Roberge ............ B65G 53/14 |
| 10,492,359 | B2 | | 12/2019 | Borkgren et al. |
| 11,391,309 | B2 | * | 7/2022 | Schmidt ............ F15C 1/18 |
| 2007/0041795 | A1 | * | 2/2007 | Neto ............ B01J 23/002 406/117 |
| 2013/0004247 | A1 | * | 1/2013 | Reece ............ B65D 88/70 222/195 |

FOREIGN PATENT DOCUMENTS

| | | |
|---|---|---|
| WO | 2018136926 | 7/2018 |
| WO | 2020049387 | 3/2020 |

PRODUCT DELIVERY CONDUIT FOR AN AGRICULTURAL PRODUCT HOPPER ASSEMBLY

BACKGROUND

The present disclosure relates generally to a product delivery conduit for an agricultural product hopper assembly.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit agricultural product (e.g., seed, fertilizer, etc.) at a desired depth beneath the soil surface of a field, thereby establishing rows of planted agricultural product. For example, each row unit typically includes a ground engaging tool or opener that forms a path (e.g., trench) for agricultural product deposition into the soil. An agricultural product conveying system (e.g., seed tube or powered agricultural product conveyor) is configured to deposit the agricultural product into the trench. The opener/agricultural product conveying system may be followed by closing discs that move displaced soil back into the trench and/or a packer wheel that packs the soil on top of the deposited agricultural product. Furthermore, each row unit may include an agricultural product meter configured to control a flow of the agricultural product from an agricultural product hopper assembly into the agricultural product conveying system, thereby controlling agricultural product spacing within the soil.

In certain planting implements, at least a portion of the row units may be rotated in a forward direction from a working position to a non-working position (e.g., headland position, transport position, etc.). As the row unit(s) rotate in the forward direction, gravity drives the agricultural product to move within the respective agricultural product hopper assembly/assemblies. For example, certain agricultural product hopper assemblies include a hopper and a product delivery conduit extending through the hopper. The product delivery conduit is configured to transfer the agricultural product from an inlet conduit (e.g., including a flexible product conveying hose and an interface conduit) to a storage area within the hopper. While the agricultural product hopper assembly is in the working position, the agricultural product fills a portion of the product delivery conduit. Accordingly, in response to rotation of the agricultural product hopper assembly from the working position to the non-working position, gravity may drive the agricultural product to flow through the product delivery conduit to the inlet conduit. Unfortunately, the agricultural product may clump within the inlet conduit, thereby establishing/inducing formation of an obstruction that may interfere with agricultural product flow to the hopper while the agricultural product hopper assembly is in the working position.

BRIEF DESCRIPTION

In certain embodiments, a product delivery conduit for an agricultural product hopper assembly includes an inlet segment and an outlet segment. The inlet segment is configured to receive agricultural product from an inlet conduit, and the outlet segment is configured to output the agricultural product to a storage area within a hopper of the agricultural product hopper assembly. In addition, the outlet segment is angled relative to the inlet segment, and the outlet segment is configured to be oriented substantially vertically while the agricultural product hopper assembly is in a working position to enable the agricultural product to fill at least a portion of the outlet segment. Furthermore, the inlet segment and the outlet segment are configured to position an outlet of the product delivery conduit above the storage area while the agricultural product hopper assembly is in a non-working position, and the outlet segment is configured to be oriented downwardly while the agricultural product hopper assembly is in the non-working position to enable the agricultural product to flow into the storage area.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
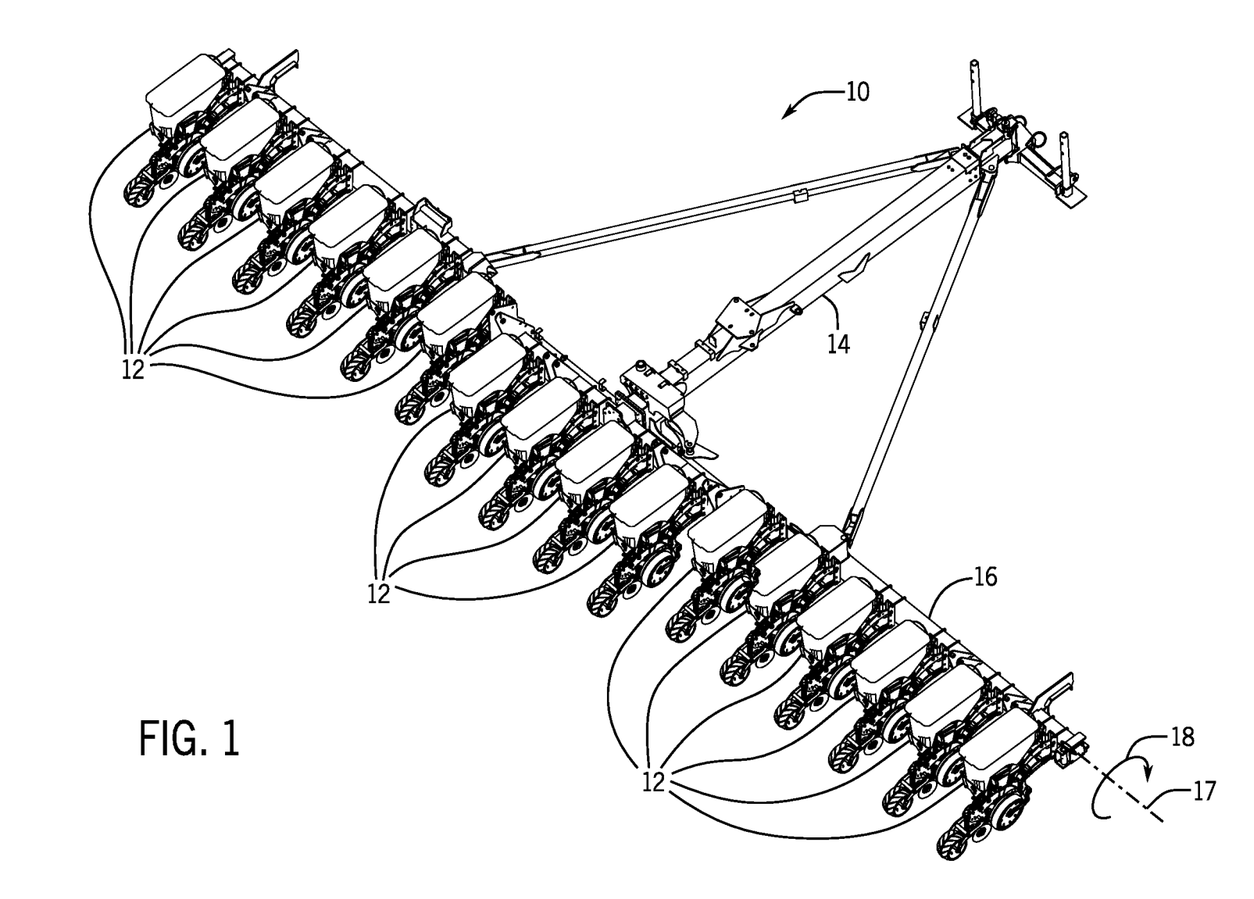
FIG. 1 is a perspective view of an embodiment of an agricultural implement having multiple row units distributed across a width of the agricultural implement.

FIG. 1 is a perspective view of an embodiment of an agricultural implement 10 (e.g., planting implement) having multiple row units 12 distributed across a width of the agricultural implement 10. The agricultural implement 10 is configured to be towed through a field behind a work vehicle, such as a tractor. As illustrated, the agricultural implement 10 includes a tongue assembly 14, which includes a hitch configured to couple the agricultural implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a path (e.g., trench) within soil of a field. The row unit 12 may also include an agricultural product conveying system (e.g., seed tube or powered agricultural product conveyer) configured to deposit agricultural product (e.g., seed, fertilizer, etc.) into the path/trench. In addition, the row unit 12 may include closing disc(s) and/or a packer wheel positioned behind the agricultural product conveying system. The closing disc(s) are configured to move displaced soil back into the path/trench, and the packer wheel is configured to pack soil on top of the deposited agricultural product. Furthermore, the row unit 12 may include an agricultural product meter configured to control a flow of the agricultural product from an agricultural product hopper assembly into the agricultural product conveying system, thereby controlling agricultural product spacing within the soil.

In certain embodiments, at least a portion of the row units 12 may be rotated upwardly about a lateral axis 17 from the illustrated working position to a non-working position (e.g., headland position, transport position, etc.). For example, at least a portion of the toolbar 16 may be rotated in a forward direction 18 about the lateral axis 17, thereby rotating the row units 12 coupled to the toolbar 16/portion of the toolbar 16 from the working position to the non-working position. Additionally or alternatively, one or more row units 12 may be rotated relative to the toolbar 16 in the forward direction 18 from the working position to the non-working position. As the row unit(s) 12 rotate in the forward direction 18, gravity drives the agricultural product to move within the respective agricultural product hopper assembly/assemblies. Accordingly, at least one agricultural product hopper assembly (e.g., each agricultural product hopper assembly of the agricultural implement 10) may include a product delivery conduit configured to substantially inhibit flow of the agricultural product from the agricultural product hopper assembly to a respective inlet conduit (e.g., including a flexible product conveying hose and an interface conduit) while the respective row unit 12 is in the non-working position.

In certain embodiments, the product delivery conduit includes an inlet segment and an outlet segment. The inlet segment is configured to receive the agricultural product from the inlet conduit, and the outlet segment is configured to output the agricultural product to a storage area within a hopper of the agricultural product hopper assembly. The outlet segment is angled relative to the inlet segment, and the outlet segment is configured to be oriented substantially vertically while the agricultural product hopper assembly is in the working position to enable the agricultural product to fill at least a portion of the outlet segment. In addition, the inlet segment and the outlet segment are configured to position an outlet of the product delivery conduit above the storage area while the agricultural product hopper assembly is in the non-working position. Accordingly, flow of the agricultural product from the storage area to the inlet conduit is substantially inhibited. Furthermore, the outlet segment is configured to be oriented downwardly while the agricultural product hopper assembly is in the non-working position to enable the agricultural product to flow into the storage area. Accordingly, residual agricultural product within the outlet segment may flow into the storage area as the agricultural product hopper assembly transitions from the working position to the non-working position. Due to the configuration of the product delivery conduit, substantially all of the agricultural product within the agricultural product hopper assembly flows to the storage area during the rotation of the agricultural product hopper assembly from the working position to the non-working position. Accordingly, flow of the agricultural product from the agricultural product hopper assembly into the inlet conduit during the rotation of the agricultural product hopper assembly from the working position to the non-working position is substantially inhibited, thereby substantially reducing or eliminating the possibility of obstruction formation within the inlet conduit (e.g., within the flexible product conveying hose and/or within the interface conduit).

Figure 2:
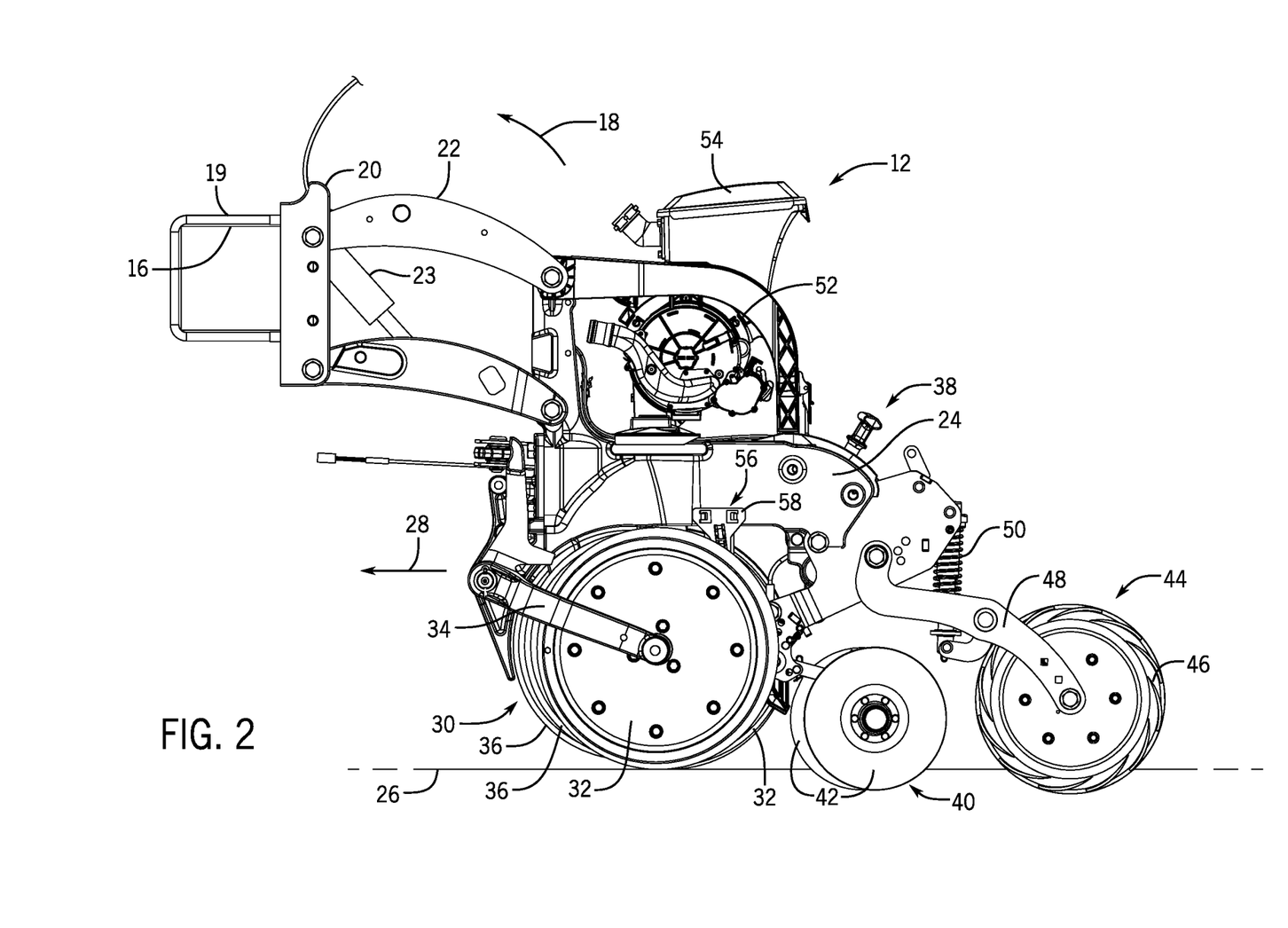
FIG. 2 is a side view of an embodiment of a row unit that may be employed on the agricultural implement of FIG. 1.

FIG. 2 is a side view of an embodiment of a row unit 12 (e.g., agricultural row unit) that may be employed on the agricultural implement of FIG. 1. The row unit 12 includes a mount 19 configured to secure the row unit 12 to the tool bar 16 of the agricultural implement. In the illustrated embodiment, the mount 19 includes a U-bolt that secures a bracket 20 of the row unit 12 to the tool bar 16. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar 16 in response to variations in a soil surface 26. In the illustrated embodiment, an actuator 23 (e.g., hydraulic actuator, pneumatic actuator, electromechanical actuator, etc.) is configured to urge the frame 24 toward the soil surface 26. While the illustrated linkage assembly 22 is a parallel linkage assembly (e.g., a four-bar linkage assembly), in other embodiments, another suitable linkage assembly may extend between the bracket and the frame. In certain embodiments, the toolbar 16 is configured to be driven to rotate about the lateral axis (e.g., by one or more actuators), thereby rotating the row unit 12 in the forward direction 18 from the illustrated working position to the non-working position (e.g., headland position, transport position, etc.). Furthermore, in certain embodiments, the toolbar may be coupled to a second tool bar by a linkage, and an actuator may drive the first toolbar to rotate relative to the second toolbar, thereby rotating the row unit in the forward direction from the illustrated working position to the non-working position.

The row unit 12 is configured to deposit agricultural product (e.g., seed, fertilizer, etc.) at a target depth beneath the soil surface 26 as the row unit 12 traverses a field along a direction of travel 28. The row unit 12 includes an opener assembly 30 that forms a trench in the soil for agricultural product deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate a trench into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 also includes an agricultural product conveying system (e.g., seed tube or powered agricultural product conveyor) configured to deposit agricultural product (e.g., seed, fertilizer, etc.) into the trench. The opener assembly 30 and the agricultural product conveying system are followed by a closing assembly 40 that moves displaced soil back into the trench. In the illustrated embodiment, the closing assembly 40 includes two closing discs 42. However, in other embodiments, the closing assembly may include other suitable closing device(s) (e.g., a single closing disc, etc.). In addition, in certain embodiments, the closing assembly may be omitted. In the illustrated embodiment, the closing assembly 40 is followed by a packing assembly 44 configured to pack soil on top of the deposited agricultural product. The packing assembly 44 includes a packer wheel 46, an arm 48 that pivotally couples the packer wheel 46 to the frame 24, and a biasing member 50 configured to urge the packer wheel 46 toward the soil surface 26, thereby enabling the packer wheel to pack soil on top of the deposited agricultural product. While the illustrated biasing member 50 includes a spring, in other embodiments, the biasing member may include another suitable biasing device, such as a hydraulic cylinder or a pneumatic cylinder, among others. Furthermore, in certain embodiments, the packing assembly may be omitted.

The row unit 12 includes a vacuum agricultural product meter 52 configured to receive agricultural product (e.g., seed, fertilizer, etc.) from an agricultural product hopper assembly 54. In certain embodiments, the vacuum agricultural product meter 52 includes a disc having multiple openings. An air pressure differential between opposite sides of the disc induces the agricultural product (e.g., seed, etc.) to be captured within the openings. As the disc rotates, the agricultural product is conveyed toward the agricultural product conveying system. Once the agricultural product (e.g., seed, etc.) enters an outlet that extends to the agricultural product conveying system, the air pressure on each side of the disc is substantially equalized (e.g., at the end of a vacuum passage), thereby enabling the agricultural product (e.g., seed, etc.) to enter the agricultural product conveying system (e.g., seed tube or powered agricultural product conveyor). The agricultural product conveying system then directs the agricultural product to the trench. While the illustrated embodiment includes a vacuum agricultural product meter, in other embodiments, other suitable types of agricultural product meters may be utilized. As used herein, "vacuum" refers to an air pressure that is less than the ambient atmospheric air pressure, and not necessarily 0 pa.

In the illustrated embodiment, the row unit 12 includes a scraper assembly 56 having an outer scraper 58 coupled to the frame 24 and configured to engage an outer surface of an opener disc 36. Furthermore, in certain embodiments, the scraper assembly may include an inner scraper configured to engage an inner surface of the opener disc 36. The scraper assembly 56 is configured to remove accumulated soil from the opener disc 36, thereby enhancing the accuracy and efficiency of the seed path/trench forming process. Furthermore, in certain embodiments, the scraper assembly may include a second outer scraper and, in certain embodiments, a second inner scraper configured to remove accumulated soil from a second opener disc of the row unit. In addition, in certain embodiments, the scraper assembly may be omitted.

While the row unit/agricultural product hopper assembly is in the working position, the agricultural product meter may be activated, which drives the disc to rotate, thereby flowing metered agricultural product to the agricultural product conveying system. Furthermore, before rotating the row unit/agricultural product hopper assembly to the non-working position (e.g., headland position, transport position, etc.), the agricultural product meter is deactivated, which terminates rotation of the disc, thereby terminating metered agricultural product flow to the agricultural product conveying system. As discussed in detail below, the agricultural product hopper assembly 54 includes a product delivery conduit configured to substantially inhibit flow of the agricultural product from the agricultural product hopper assembly to an inlet conduit while the row unit/agricultural product hopper assembly is in the non-working position.

In certain embodiments, the product delivery conduit includes a flow passage having a bend positioned between an inlet and an outlet of the flow passage. The flow passage is configured to receive the agricultural product via the inlet, and the flow passage is configured to output the agricultural product to a storage area within a hopper of the agricultural product hopper assembly via the outlet. In addition, the bend is configured to establish an angle between the inlet and the outlet of less than 90 degrees. Furthermore, the flow passage is configured to enable the agricultural product to fill a portion of the flow passage while the agricultural product hopper assembly is in the working position. The flow passage is also configured to position the outlet above the storage area while the agricultural product hopper assembly is in the non-working position. Accordingly, flow of the agricultural product from the storage area to the inlet conduit is substantially inhibited. Furthermore, a section of the flow passage extending from the bend to the outlet is configured to be oriented downwardly while the agricultural product hopper assembly is in the non-working position to enable the agricultural product to flow into the storage area. Accordingly, residual agricultural product within the section of the flow passage may flow into the storage area as the agricultural product hopper assembly transitions from the working position to the non-working position. Due to the configuration of the product delivery conduit, substantially all of the agricultural product within the agricultural product hopper assembly flows to the storage area during the rotation of the agricultural product hopper assembly from the working position to the non-working position. Accordingly, flow of the agricultural product from the agricultural product hopper assembly into the inlet conduit during the rotation of the agricultural product hopper assembly from the working position to the non-working position is substantially inhibited, thereby substantially reducing or eliminating the possibility of obstruction formation within the inlet conduit.

Figure 3:
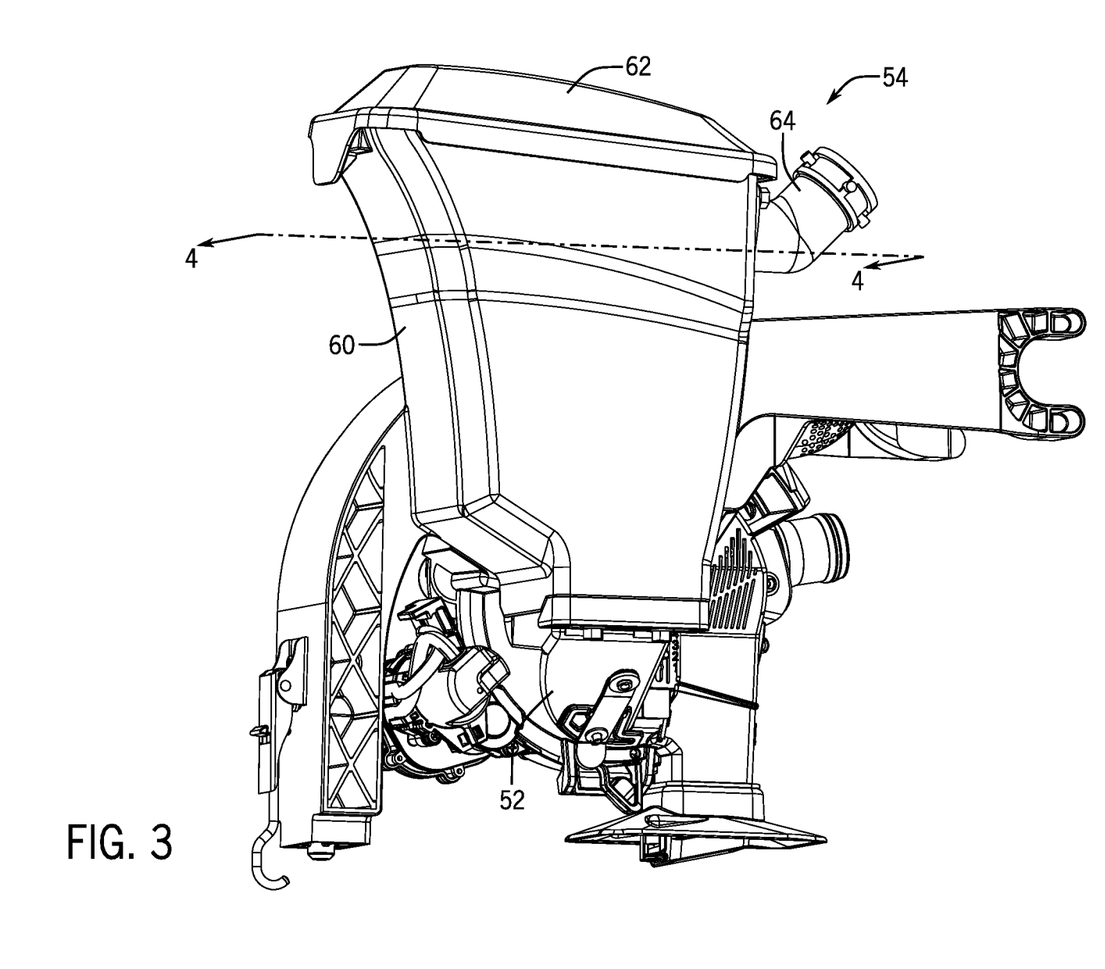
FIG. 3 is a perspective view of an embodiment of an agricultural product hopper assembly that may be employed within the row unit of FIG. 2.

FIG. 3 is a perspective view of an embodiment of an agricultural product hopper assembly 54 that may be employed within the row unit of FIG. 2. In the illustrated embodiment, the agricultural product hopper assembly 54 includes a hopper 60 and a lid 62 coupled to the hopper 60. The lid 62 is selectively removable from the hopper 60 to provide access to an interior of the hopper 60. As illustrated, the hopper 60 of the agricultural product hopper assembly 54 is coupled to the agricultural product meter 52. As discussed in detail below, the hopper 60 has a storage area for agricultural product, and the hopper 60 is configured to direct the agricultural product from the storage area into the agricultural product meter 52.

In the illustrated embodiment, the hopper 60 is coupled to a portion of an inlet conduit 64 (e.g., an interface conduit of the inlet conduit). The inlet conduit 64 (e.g., including the interface conduit and a flexible product conveying hose) is configured to convey the agricultural product from a remote agricultural storage assembly to the agricultural product hopper assembly 54. For example, an interface conduit of the inlet conduit may be coupled to the agricultural product hopper assembly, and a flexible product conveying hose of the inlet conduit may extend from the remote agricultural storage assembly to the interface conduit. In certain embodiments, the remote agricultural product storage assembly may include an agricultural product storage compartment and an inductor assembly coupled to a bottom portion of the agricultural product storage compartment. During operation of the agricultural implement, the agricultural product may flow from the agricultural product storage compartment into the inductor assembly under the influence of gravity. Within the inductor assembly, air from an air source (e.g., blower, fan, etc.) may fluidize the agricultural product, thereby establishing an airflow having entrained agricultural product. Inlet conduits (e.g., each including a respective flexible product conveying hose and a respective interface conduit) may be coupled to the inductor assembly, and each inlet conduit may be configured to receive the airflow having the entrained agricultural product. Each inlet conduit may direct the airflow/entrained agricultural product to the agricultural product hopper assembly of a respective row unit. As discussed in detail below, the agricultural product hopper assembly is configured to automatically terminate flow of the air/entrained agricultural product to the agricultural product hopper assembly in response to the agricultural product hopper assembly receiving a maximum target amount of the agricultural product.

While the agricultural product hopper assembly 54 is in the working position, the agricultural product hopper assembly 54 may receive the agricultural product from the inlet conduit 64 (e.g., in response to the amount of agricultural product within the agricultural product hopper assembly decreasing below a minimum target amount of the agricultural product). In addition, the agricultural product meter 52 may be activated, which drives the disc to rotate, thereby flowing metered agricultural product to the agricultural product conveying system. Furthermore, before rotating the row unit/agricultural product hopper assembly to the non-working position (e.g., headland position, transport position, etc.), the agricultural product flow through the inlet conduit 64 may be terminated (e.g., by terminating airflow to the inductor assembly, by terminating flow of the air/entrained agricultural product from the inductor assembly to the inlet conduit, etc.). In addition, the agricultural product meter may be deactivated, which terminates rotation of the disc, thereby terminating metered agricultural product flow to the agricultural product conveying system. As discussed in detail below, the agricultural product hopper assembly 54 includes a product delivery conduit configured to substantially inhibit flow of the agricultural product from the agricultural product hopper assembly to the inlet conduit 64 while the agricultural product hopper assembly 54 is in the non-working position.

Figure 4:
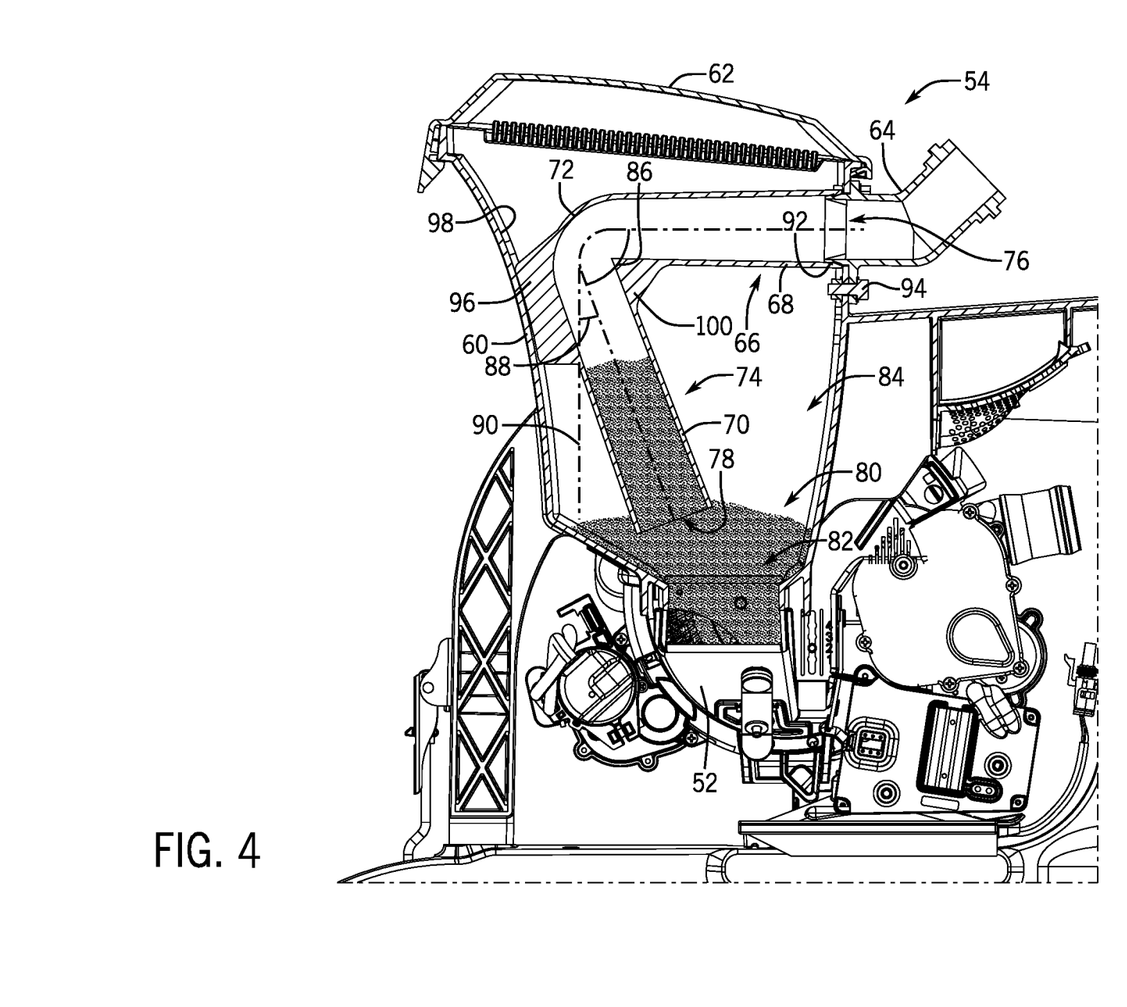
FIG. 4 is a cross-sectional view of the agricultural product hopper assembly of FIG. 3, taken along line 4-4 of FIG. 3, in which the agricultural product hopper assembly is in a working position.

FIG. 4 is a cross-sectional view of the agricultural product hopper assembly 54 of FIG. 3, taken along line 4-4 of FIG. 3, in which the agricultural product hopper assembly 54 is in the working position. In the illustrated embodiment, the agricultural product hopper assembly 54 includes a product delivery conduit 66 disposed within the hopper 60. The product delivery conduit 66 includes an inlet segment 68, an outlet segment 70, and a bend 72, which collectively form a flow passage 74 extending between an inlet 76 and an outlet 78 of the product delivery conduit 66. The inlet segment 68 is configured to receive agricultural product from the inlet conduit 64 (e.g., via the inlet 76), and the outlet segment 70 is configured to output the agricultural product to a storage area 80 within the hopper 60 (e.g., via the outlet 78). As used herein, "storage area" refers to the portion of the hopper that collects/stores the agricultural product while the agricultural product hopper assembly is in a current position/orientation. For example, while the agricultural product hopper assembly 54 is in the illustrated working position, the storage area 80 is positioned at a base portion 82 of the hopper 60. In addition, while the agricultural product hopper assembly 54 is in the non-working position, the storage area may be positioned at a side portion 84 of the hopper 60. The agricultural product may move from the base portion to the side portion under the influence of gravity as the agricultural product hopper assembly rotates from the working position to the non-working position.

As illustrated, the outlet segment 70 is angled relative to the inlet segment 68. For example, the bend 72 may be configured to establish an angle 86 between inlet 76 (e.g., a direction of agricultural product flow through the inlet 76) and the outlet 78 (e.g., a direction of agricultural product flow through the outlet 78) of less than 90 degrees. In certain embodiments, the angle 86 between the inlet 76 and the outlet 78 may be between about 30 degrees and about 90 degrees, between about 40 degrees and about 90 degrees, between about 45 degrees and about 90 degrees, between about 50 degrees and about 90 degrees, between about 55 degrees and about 90 degrees, between about 60 degrees and about 90 degrees, between about 65 degrees and about 90 degrees, between about 70 degrees and about 90 degrees, between about 75 degrees and about 90 degrees, between about 80 degrees and about 90 degrees, or between about 85 degrees and about 90 degrees. Furthermore, in certain embodiments, the angle 86 between the inlet 76 and the outlet 78 may be greater than 90 degrees. As discussed in detail below, the angle 86 may be selected such that the outlet segment 70 (e.g., a section of the flow passage 74 extending from the bend 72 to the outlet 78) is oriented downwardly while the agricultural product hopper assembly 54 is in the non-working position to enable the agricultural product to flow into the storage area.

In the illustrated embodiment, the outlet segment 70 is oriented substantially vertically while the agricultural product hopper assembly 54 is in the working position, thereby enabling the agricultural product to fill at least a portion of the outlet segment 70 (e.g., portion of the flow passage 74). As used herein, "substantially vertically" refers to an angle 88 between the outlet segment 70 and a vertical axis 90 of the agricultural product hopper assembly 54 of less than 45 degrees, less than 40 degrees, less than 35 degrees, less than 30 degrees, less than 20 degrees, less than 15 degrees, or less than 10 degrees. Furthermore, in the illustrated embodiment, the inlet segment 68 is oriented generally perpendicularly to the vertical axis 90. However, in other embodiments, the inlet segment may be oriented at any other suitable angle relative to the vertical axis.

The inlet conduit 64 (e.g., including the flexible product conveying hose and the interface conduit) is configured to direct the airflow having entrained agricultural product from the inductor assembly to the product delivery conduit 66 of the agricultural product hopper assembly 54. During operation of the row unit, the agricultural product flows through the product delivery conduit 66 to the storage area 80 of the hopper 60. Because the hopper 60 is vented, the airflow carrying the agricultural product is exhausted to the environment, thereby enabling the agricultural product to collect within the storage area 80. As the storage area 80 fills with agricultural product, the agricultural product may collect within at least a portion of the outlet segment 70 of the product delivery conduit 66, as illustrated. Because the product delivery conduit 66 is not vented, the agricultural product within the outlet segment 70 of the product delivery conduit 66 may block the airflow through the inlet conduit 64/product delivery conduit 66, thereby blocking flow of the agricultural product to the agricultural product hopper assembly 54. Accordingly, the agricultural product hopper assembly automatically terminates flow of the air/entrained agricultural product to the agricultural product hopper assembly in response to the agricultural product hopper assembly receiving a maximum target amount of the agricultural product. Furthermore, as the level of agricultural product within the outlet segment 70 decreases during operation of the row unit (e.g., as the agricultural product meter 52 conveys the agricultural product to the agricultural product conveying system), the airflow path to the hopper vent(s) is reestablished, thereby enabling agricultural product flow to the agricultural product hopper assembly 54 to resume. Accordingly, the agricultural product hopper assembly automatically enables flow of the air/entrained agricultural product to the agricultural product hopper assembly in response to the agricultural product level decreasing below a minimum target amount.

In the illustrated embodiment, the inlet segment 68 is substantially linear, and the outlet segment 70 is substantially linear. However, in other embodiments, at least one of the inlet segment or the outlet segment may have another suitable configuration (e.g., curved, polygonal, bent, etc.). Furthermore, the flow passage 74 may have any suitable cross-sectional shape (e.g., circular, polygonal, polygonal with rounded corners, elliptical, irregular, etc.). In addition, the cross-sectional shape may vary within the flow passage. For example, in certain embodiments, the cross-sectional shape of the inlet segment may be different than the cross-sectional shape of the outlet segment.

In the illustrated embodiment, the inlet segment 68 tapers inwardly from the inlet 76 toward the outlet segment 70 (e.g., from the inlet 76 to the bend 72). In certain embodiments, the inlet segment may taper inwardly at an angle of about 0.5 degrees, about 1 degree, about 2 degrees, about 3 degrees, about 4 degrees, or about 5 degrees. Furthermore, in certain embodiments, the inlet segment may not have a taper, the inlet segment may taper outwardly from the inlet toward the outlet segment (e.g., from the inlet to the bend), or the taper may vary along the inlet segment. In addition, in the illustrated embodiment, the outlet segment 70 tapers inwardly from the outlet 78 toward the inlet segment 68 (e.g., from the outlet 78 to the bend 72). In certain embodiments, the outlet segment may taper inwardly at an angle of about 0.5 degrees, about 1 degree, about 2 degrees, about 3 degrees, about 4 degrees, or about 5 degrees. Because the outlet segment 70 tapers inwardly from the outlet 78 toward the inlet segment 68/to the bend 72, the cross-sectional area of the outlet segment 70 increases along the direction of agricultural product flow through the outlet segment 70, thereby facilitating flow of the agricultural product to the storage area 80. Furthermore, in certain embodiments, the outlet segment may not have a taper, the outlet segment may taper outwardly from the outlet toward the inlet segment (e.g., from the outlet to the bend), or the taper may vary along the outlet segment.

In the illustrated embodiment, the inlet segment 68 has a lip 92 (e.g., proximate to the inlet 76) configured to couple the product delivery conduit 66 to the inlet conduit 64 (e.g., to the interface conduit of the inlet conduit). The lip 92 is configured to engage the inlet conduit 64 via application of force to the product delivery conduit 66 in the direction of the inlet conduit 64. In the illustrated embodiment, the inlet conduit 64 (e.g., the interface conduit of the inlet conduit) is coupled to the hopper 60 via fastener(s) 94. Accordingly, the product delivery conduit 66 is coupled to the hopper 60 via the inlet conduit 64. While the inlet conduit is coupled to the hopper by fastener(s) in the illustrated embodiment, in other embodiments, the inlet conduit may be coupled to the hopper by any suitable type(s) of connection(s) (e.g., alone or in combination with the fastener(s)), such as latch(es), welded connection(s), adhesive connection(s), other suitable type(s) of connection(s), or a combination thereof.

In the illustrated embodiment, the product delivery conduit 66 includes a flange 96 coupled to the outlet segment 70. The flange 96 is configured to contact an inner surface 98 of the hopper 60 to block movement of the product delivery conduit 66 relative to the hopper 60. As illustrated, the contact surface of the flange 96 is shaped to substantially match the contour of the inner surface 98 of the hopper 60. In the illustrated embodiment, the flange 96 is integrally formed with the flow passage 74 (e.g., via an injection molding process, via a compression molding process, etc.). However, in other embodiments, the flange may be formed separately and coupled to the flow passage. While the product delivery conduit 66 has a single flange 96 coupled to the outlet segment 70 in the illustrated embodiment, in other embodiments, the product delivery conduit may have more or fewer flanges (e.g., 0, 2, 3, 4, 5, 6, or more), and each flange (e.g., the illustrated single flange) may be located in any suitable position on the product delivery conduit to contact a respective inner surface of the hopper/lid. Furthermore, while the flange 96 is not coupled to the hopper 60 by a connection in the illustrated embodiment, in other embodiments, at least one flange may be coupled to the hopper/lid by any suitable type(s) of connection(s) (e.g., fastener(s), adhesive connection(s), welded connection(s), etc.). In addition, while the product delivery conduit 66 is coupled to the hopper 60 by the lip 92 and the flange 96 in the illustrated embodiment, in other embodiments, the product delivery conduit may be coupled to the hopper by other suitable type(s) of connection(s) (e.g., alone or in combination with the lip and/or the flange(s)), such as fastener connection(s), welded connection(s), adhesive connection(s), other suitable type(s) of connection(s), or a combination thereof.

In the illustrated embodiment, the product delivery conduit 66 includes a support 100 coupled to the inlet segment 68 and to the outlet segment 70. The support 100 is configured to block rotation of the outlet segment 70 relative to the inlet segment 68 (e.g., block bending of the flow passage 74 at the bend 72). In the illustrated embodiment, the support 100 is integrally formed with the flow passage 74 (e.g., via an injection molding process, via a compression molding process, etc.). However, in other embodiments, the support may be formed separately and coupled to the flow passage. Furthermore, while the product delivery conduit 66 has a single support 100 coupled to the inlet segment 68 and to the outlet segment 70 in the illustrated embodiment, in other embodiments, the product delivery conduit may have more or fewer supports (e.g., 0, 2, 3, 4, 5, 6, or more), and each support (e.g., the illustrated single support) may be located in any suitable position on the product delivery conduit.

During certain types of operations (e.g., while planting smaller seeds, such as canola, etc.), the product delivery conduit 66 may be removed from the hopper 66, and a plug may be coupled to the inlet conduit 64 (e.g., to the interface conduit of the inlet conduit), thereby blocking airflow/entrained agricultural product into the hopper 60. The hopper 60 may then be filled with agricultural product, such as smaller seeds (e.g., canola). For example, the lid 62 may be selectively opened to enable an operator to fill the hopper 60 with the agricultural product. The agricultural product meter 52 may receive the agricultural product from the hopper 60 during operation of the row unit.

Figure 5:
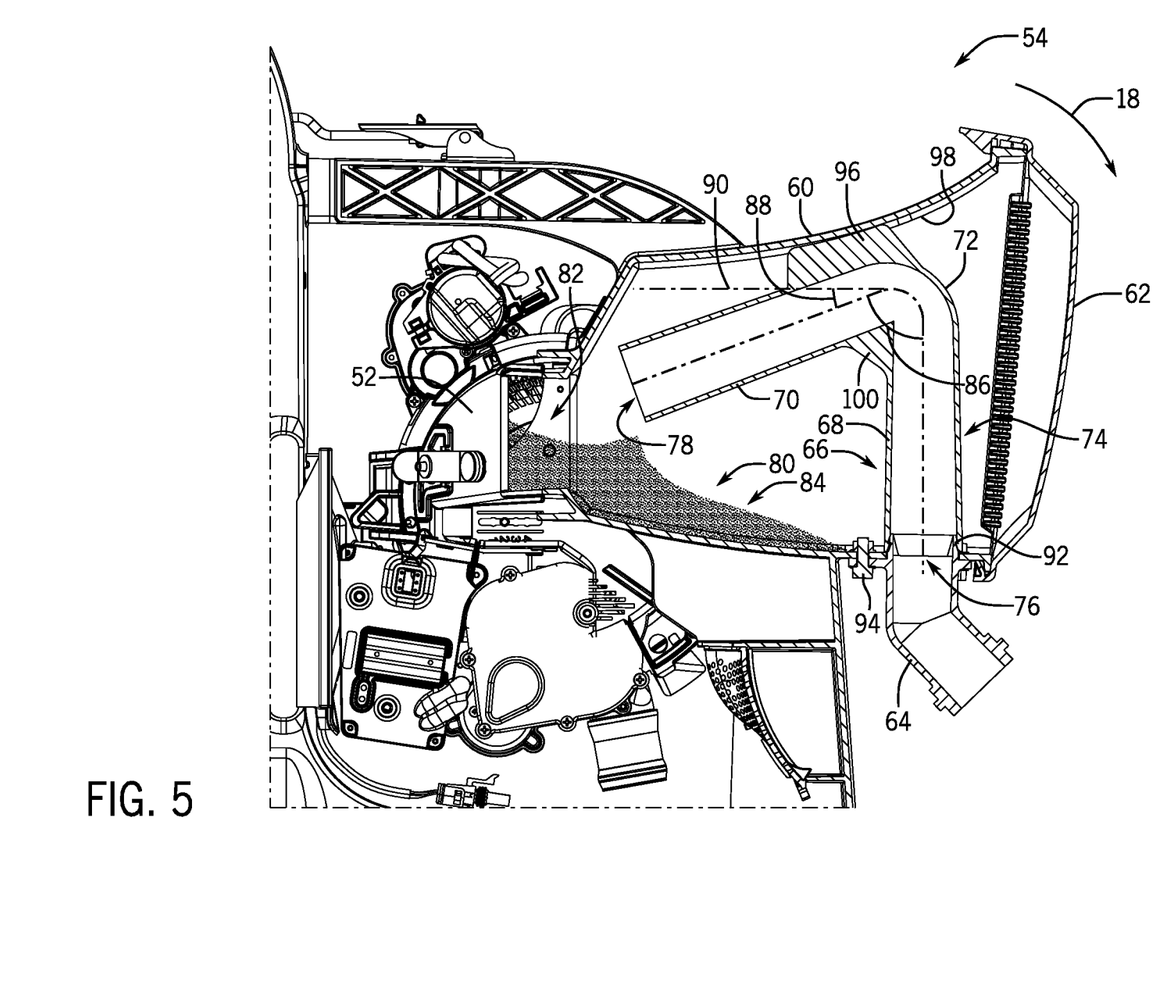
FIG. 5 is a cross-sectional view of the agricultural product hopper assembly of FIG. 3, taken along line 4-4 of FIG. 3, in which the agricultural product hopper assembly is in a non-working position.

FIG. 5 is a cross-sectional view of the agricultural product hopper assembly 54 of FIG. 3, taken along line 4-4 of FIG. 3, in which the agricultural product hopper assembly 54 is in the non-working position. In the illustrated embodiment, the agricultural hopper assembly 54 is rotated about 90 degrees in the forward direction 18 from the working position, as shown in FIG. 4, to the illustrated non-working position. However, in other embodiments, the agricultural product hopper assembly may be rotated greater than 90 degrees or less than 90 degrees in the forward direction from the working position to the non-working position. In certain embodiments, the agricultural product hopper assembly may be rotated about 45 degrees, about 60 degrees, about 70 degrees, about 80 degrees, about 90 degrees, about 100 degrees, about 110 degrees, or about 120 degrees in the forward direction from the working position to the non-working position. For example, in certain embodiments, the agricultural product hopper assembly may be rotated about 55 degrees to about 65 degrees in the forward direction from the working position to the headland position, and/or the agricultural product hopper assembly may be rotated about 80 degrees to about 110 degrees (e.g., about 82 degrees, about 97 degrees, etc.) in the forward direction from the working position to the transport position.

As illustrated, the flow passage 74 (e.g., the inlet segment 68 and the outlet segment 70 of the flow passage 74) is configured to position the outlet 78 of the product delivery conduit 66 above the storage area 80 while the agricultural product hopper assembly 54 is in a non-working position. As previously discussed, "storage area" refers to the portion of the hopper that collects/stores the agricultural product while the agricultural product hopper assembly is in a current position/orientation. Accordingly, while the agricultural product hopper assembly 54 is in the illustrated non-working position, the storage area 80 is positioned at the side portion 84 of the hopper 60. Because the outlet 78 is positioned above the storage area 80, flow of the agricultural product from the storage area 80 to the inlet conduit 64 (e.g., to the interface conduit and/or to the flexible product conveying hose of the inlet conduit) is substantially inhibited while the agricultural product hopper assembly 54 is in the non-working position.

Furthermore, the outlet segment 70 (e.g., a section of the flow passage 74 extending from the bend 72 to the outlet 78) is configured to be oriented downwardly while the agricultural product hopper assembly 54 is in the illustrated non-working position to enable the agricultural product to flow into the storage area 80. Accordingly, residual agricultural product within the outlet segment 70 may flow into the storage area 80 as the agricultural product hopper assembly 54 transitions from the working position to the non-working position. Due to the configuration of the product delivery conduit 66 (e.g., the angle 86 between the inlet 76 and the outlet 78, a length of the outlet segment 70, a length of the inlet segment 68, etc.), substantially all of the agricultural product within the agricultural product hopper assembly 54 flows to the storage area 80 during the rotation of the agricultural product hopper assembly 54 from the working position to the non-working position. Accordingly, flow of the agricultural product from the agricultural product hopper assembly 54 into the inlet conduit 64 (e.g., into the interface conduit and/or into the flexible product conveying hose of the inlet conduit) is substantially inhibited while the agricultural product hopper assembly 54 is in the non-working position, thereby substantially reducing or eliminating the possibility of obstruction formation within the inlet conduit 64. In addition, the illustrated agricultural product hopper assembly is configured to substantially inhibit flow of the agricultural product from the agricultural product hopper assembly to the inlet conduit without any moving parts, thereby reducing the cost and increasing the reliability of the agricultural product hopper assembly (e.g., as compared to an agricultural product hopper assembly that employs a valve to substantially block flow of the agricultural product from the agricultural product hopper assembly to the inlet conduit while the agricultural product hopper assembly is in the non-working position).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement, comprising:
   a toolbar;
   an actuator; and
   a row unit coupled to the toolbar, wherein the row unit comprises an agricultural product hopper assembly, comprising:
      a hopper having a storage area; and
      an agricultural product delivery conduit coupled to the hopper, wherein the agricultural product delivery conduit comprises an inlet segment and an outlet segment, the inlet segment is configured to receive agricultural product from an inlet conduit, the outlet segment is configured to output the agricultural product to the storage area, the outlet segment is angled relative to the inlet segment, the outlet segment is configured to be oriented substantially vertically while the agricultural product hopper assembly is in a working position to enable the agricultural product to fill at least a portion of the outlet segment, the inlet segment and the outlet segment are configured to position an outlet of the product delivery conduit above the storage area while the agricultural product hopper assembly is in a non-working position, and the outlet segment is configured to be oriented downwardly while the agricultural product hopper assembly is in the non-working position to enable the agricultural product to flow into the storage area;
   wherein the actuator is configured to drive the toolbar in rotation to rotate the agricultural product hopper assembly between the working position and the non-working position, such that the agricultural product hopper assembly in the working position is at a different orientation than the agricultural product hopper assembly in the non-working position.

2. The agricultural implement of claim 1, wherein the inlet segment is substantially linear, the outlet segment is substantially linear, or a combination thereof.

3. The agricultural implement of claim 1, wherein the inlet segment tapers inwardly from an inlet of the product delivery conduit toward the outlet segment.

4. The agricultural implement of claim 1, wherein the outlet segment tapers inwardly from the outlet of the product delivery conduit toward the inlet segment.

5. The agricultural implement of claim 1, wherein the inlet segment includes a lip configured to couple the product delivery conduit to the inlet conduit.

6. The agricultural implement of claim 1, wherein the agricultural product hopper assembly comprises a flange coupled to the outlet segment, and the flange is configured to contact an inner surface of the hopper to block movement of the product delivery conduit relative to the hopper.

7. The agricultural implement of claim 1, wherein the agricultural product hopper assembly comprises a support coupled to the inlet segment and to the outlet segment, wherein the support is configured to block rotation of the outlet segment relative to the inlet segment.

8. A product delivery conduit for an agricultural product hopper assembly, comprising:
 a flow passage having a bend positioned between an inlet and an outlet of the flow passage, wherein the flow passage is configured to receive agricultural product via the inlet, the flow passage is configured to output the agricultural product to a storage area within a hopper of the agricultural product hopper assembly via the outlet, the bend is configured to establish an angle between the inlet and the outlet of less than 90 degrees, the flow passage is configured to enable the agricultural product to fill a portion of the flow passage while the agricultural product hopper assembly is in a working position, the flow passage is configured to position the outlet above the storage area while the agricultural product hopper assembly is in a non-working position, and a section of the flow passage extending from the bend to the outlet is configured to be oriented downwardly while the agricultural product hopper assembly is in the non-working position to enable the agricultural product to flow into the storage area.

9. The product delivery conduit of claim 8, wherein the flow passage tapers inwardly from the inlet to the bend.

10. The product delivery conduit of claim 8, wherein the flow passage tapers inwardly from the outlet to the bend.

11. The product delivery conduit of claim 8, wherein the flow passage comprises a lip proximate to the inlet, and the lip is configured to couple the product delivery conduit to an inlet conduit.

12. The product delivery conduit of claim 8, comprising a flange coupled to the flow passage, wherein the flange is configured to contact an inner surface of the hopper to block movement of the product delivery conduit relative to the hopper.

13. The product delivery conduit of claim 8, comprising a support coupled to the flow passage, wherein the support is configured to block bending of the flow passage at the bend.

14. The agricultural implement of claim 1, wherein the actuator is configured to drive the toolbar in rotation to rotate the agricultural product hopper assembly at least 45 degrees between the working position and the non-working position.

15. An agricultural implement, comprising:
 a toolbar;
 an actuator; and
 a row unit coupled to the toolbar, wherein the row unit comprises an agricultural product hopper assembly, comprising:
  a hopper having a storage area; and
  a product delivery conduit comprising a flow passage having a bend positioned between an inlet and an outlet of the flow passage, wherein the flow passage is configured to receive agricultural product via the inlet, the flow passage is configured to output the agricultural product to the storage area via the outlet, the bend is configured to establish an angle between the inlet and the outlet of less than 90 degrees, the flow passage is configured to enable the agricultural product to fill a portion of the flow passage while the agricultural product hopper assembly is in a working position, the flow passage is configured to position the outlet above the storage area while the agricultural product hopper assembly is in a non-working position, and a section of the flow passage extending from the bend to the outlet is configured to be oriented downwardly while the agricultural product hopper assembly is in the non-working position to enable the agricultural product to flow into the storage area;
 wherein the actuator is configured to drive the toolbar in rotation to rotate the agricultural product hopper assembly between the working position and the non-working position, such that the agricultural product hopper assembly in the working position is at a different orientation than the agricultural product hopper assembly in the non-working position.

16. The agricultural implement of claim 15, wherein the flow passage tapers inwardly from the inlet to the bend.

17. The agricultural implement of claim 15, wherein the flow passage tapers inwardly from the outlet to the bend.

18. The agricultural implement of claim 15, wherein the flow passage comprises a lip proximate to the inlet, and the lip is configured to couple the product delivery conduit to an inlet conduit.

19. The agricultural implement of claim 15, wherein the product delivery conduit comprises a flange coupled to the flow passage, wherein the flange is configured to contact an inner surface of the hopper to block movement of the product delivery conduit relative to the hopper.

20. The agricultural implement of claim 15, wherein the product delivery conduit comprises a support coupled to the flow passage, wherein the support is configured to block bending of the flow passage at the bend.

* * * * *